United States Patent
Gruhlke et al.

(10) Patent No.: US 7,205,521 B2
(45) Date of Patent: Apr. 17, 2007

(54) SPECKLE BASED SENSOR FOR THREE DIMENSIONAL NAVIGATION

(75) Inventors: Russell W. Gruhlke, Fort Collins, CO (US); Dennis C. Dlaz, Windsor, CO (US)

(73) Assignee: Avage Technologies ECBU IP (Singapore) Pte. Ltd., Singapore (SG)

( * ) Notice: Subject to any disclaimer, the term of this patent is extended or adjusted under 35 U.S.C. 154(b) by 231 days.

(21) Appl. No.: 10/632,574

(22) Filed: Jul. 31, 2003

(65) Prior Publication Data

US 2005/0024624 A1    Feb. 3, 2005

(51) Int. Cl.
*G01C 21/00* (2006.01)

(52) U.S. Cl. ............... 250/206.2; 250/221; 356/614

(58) Field of Classification Search ............ 250/206.1, 250/206.2, 221, 559.29, 559.3, 559.22, 559.23; 356/614, 623; 345/156, 158, 166
See application file for complete search history.

(56) References Cited

U.S. PATENT DOCUMENTS

| | | | |
|---|---|---|---|
| 4,712,100 A * | 12/1987 | Tsunekuni et al. | 345/166 |
| 5,644,139 A | 7/1997 | Allen et al. | 250/557 |
| 5,907,152 A * | 5/1999 | Dandliker et al. | 250/221 |
| 6,256,016 B1 * | 7/2001 | Piot et al. | 345/166 |
| 6,730,926 B2 * | 5/2004 | Boillot et al. | 250/559.23 |

OTHER PUBLICATIONS

Schnell et al., "detection of Movement with Laser SPeckle Patterns: Statistical Propertires", JOSA A, vol. 15, No. 1, 1998, pp. 207-216.

* cited by examiner

*Primary Examiner*—Thanh X. Luu
*Assistant Examiner*—Stephen Yam (57) ABSTRACT

Motion of a speckle pattern is employed to provide for navigation in three dimensions. Non-speckle optical navigation methods may also be used to provide for two dimensional surface navigation with speckle being used to provide for navigation in the third dimension.

24 Claims, 10 Drawing Sheets

SPECKLE BASED SENSOR FOR THREE DIMENSIONAL NAVIGATION

CROSS REFERENCE TO RELATED APPLICATIONS

This application is related to the patent application entitled "METHOD AND APPARATUS FOR IMPROVED COLLECTION EFFICIENCY OF SPECKLE BASED NAVIGATION SENSORS USING LIGHTPIPES AND REFLECTORS" Ser. No. 10/632,619 filed on the same day and assigned to the same assignee.

FIELD OF INVENTION

This invention relates to optical navigation devices in three dimensions such as those used with computers.

BACKGROUND OF INVENTION

Speckle patterns are created when coherent light is reflected from a target surface. If the target surface or coherent light source moves laterally, the associated speckle pattern also moves. This provides the operational basis for speckle based navigation systems. Typically, these speckle based navigation systems involve navigation in two dimensions, see for example, Schnell, Piot and Daendliker, "Detection of movement with laser speckle patterns: statistical properties", JOSA A, vol. 15, 1, pp. 207–216, 1998. Speckle patterns are interference patterns emitted from target surfaces illuminated by coherent light. If the target surface moves, the associated speckle pattern is moved as well. This physical phenomenon provides the basis for speckle based navigation sensors. Typically, speckle based navigation sensors include a laser light source, optical components and a photodetector. The speckle pattern consists of speckle "beams" that are emitted nearly isotropically from the illuminated target surface. The characteristic of nearly isotropic emission means that for lower levels of illumination the speckle flux in any one direction is relatively low and reduces the speckle sensed by the photodetector. Hence, sensors in speckle based navigation typically suffer from low collection efficiency.

Some speckle based navigation systems, see for example, Ogita, Ueda and Yamazaki, "Optical three-dimensional displacement meter", Proceedings of the SPIE International Conference on Speckle, vol. 556, pp. 139–145, 1985, use speckle for two dimensional navigation and either flux variation or interference fringe counting to provide for navigation in the third dimension. In the first approach, increasing the separation between the sensor and the target surface reduces the flux reaching the sensor according to the inverse square law. Monitoring the flux variation enables motion detection in the third dimension, the direction normal to the target surface. The amount of flux reflected from the target surface is dependent on the reflection and scattering properties of the target surface. This introduces a target surface dependence into this approach.

In the second approach, the target surface dependence is eliminated. However, the second approach is relatively involved and typically requires multiple optical components. Interference fringes are generated from the interference of a first beam from a coherent light source reflected internally in the sensor with a second beam from the coherent light source reflected from the target surface. The interference fringes are counted as the sensor separation from the target surface is changed. Each fringe represents a change of separation between the sensor and the target surface of one wavelength. Typically, a complex optical path with multiple beam splitters is required to split the coherent light beam into a first and second beam while maintaining adequate coherence correlation between the first and second beams.

Navigation capability in the third dimension is useful, for example, for use with writing capture systems for whiteboard type surfaces.

SUMMARY OF INVENTION

In accordance with the invention, motion of a speckle pattern is employed to provide for navigation in three dimensions. Speckle is independent of the particular surface to be navigated on. Two coherent sources, each source operating at a different wavelength or one coherent source appropriately filtered to provide light at two wavelengths, may be used to provide for two dimensional surface navigation and navigation in the third dimension. The use of speckle motion allows for optical navigation that is largely independent of the characteristics of the surface to be navigated over.

In a variation in accordance with the invention, non-speckle optical navigation methods such as, for example, the approach described in U.S. Pat. No. 5,644,19 or the specular reflection approach as described in copending U.S. patent application Ser. No. 10/630,169 may also be used to provide for two dimensional surface navigation with speckle being used only for navigation in the third dimension.

BRIEF DESCRIPTION OF THE DRAWINGS

FIG. 5b shows the geometry relating to the speckle portion of the embodiment shown in FIG. 5a.

DETAILED DESCRIPTION OF THE INVENTION

Figure 1:
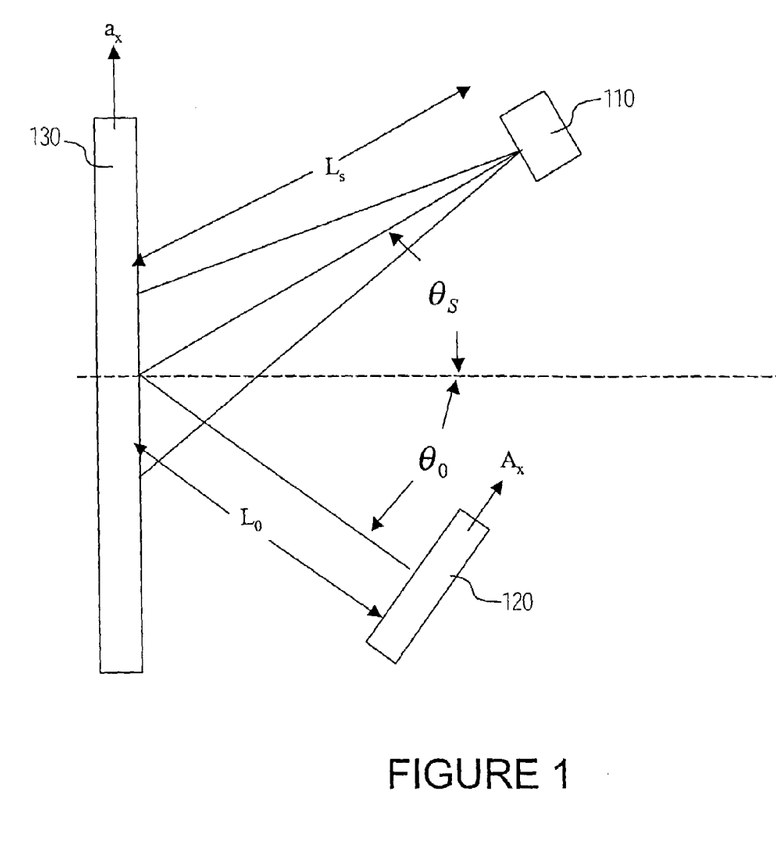
FIG. 1 illustrates the geometrical configuration for typical speckle navigation.

FIG. 1 illustrates the geometry involved with a typical speckle navigation sensor. Laser 110 illuminates target surface 130 which creates a speckle pattern that is imaged at detector 120. The radius of curvature of the laser wavefronts from laser 110 incident on target surface 130 is $L_S$. If the light hitting target surface 130 is collimated, the wavefront is planar and $L_S$ is infinite. The speckle pattern originating from target surface 130 and being imaged at detector 120 travels a distance $L_0$. If the angles of incidence and speckle emission are $\theta_S$ and $\theta_0$, respectively, then a displacement relative to the target equal to $a_x$ causes a displacement of the speckle pattern at detector 120 equal to $A_x$. $A_x$ and $a_x$ are related to each other by the following expression:

$$A_x = a_x \left\{ \frac{L_0 \cos^2 \theta_S}{L_S \cos \theta_0} + \cos \theta_0 \right\} \quad (1)$$

where only motion in the x direction in the x-y plane is considered in the derivation without loss of generality. For motion in the y direction in the x-y plane the expression is functionally the same and arbitrary motion in the x-y plane is determined by combination of the two expressions.

Figure 2A:
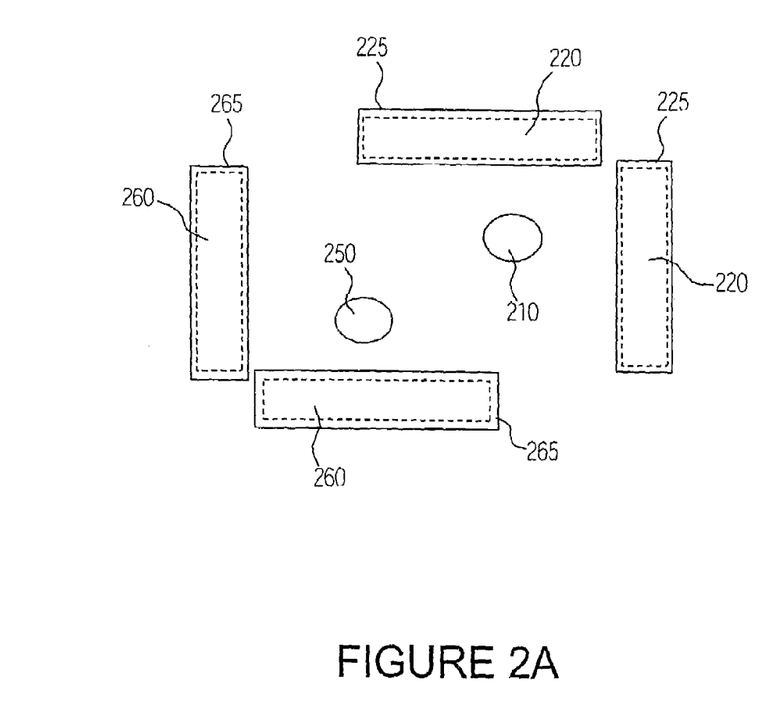
FIG. 2a shows a simplified top view of an embodiment in accordance with the invention.
Figure 2B:
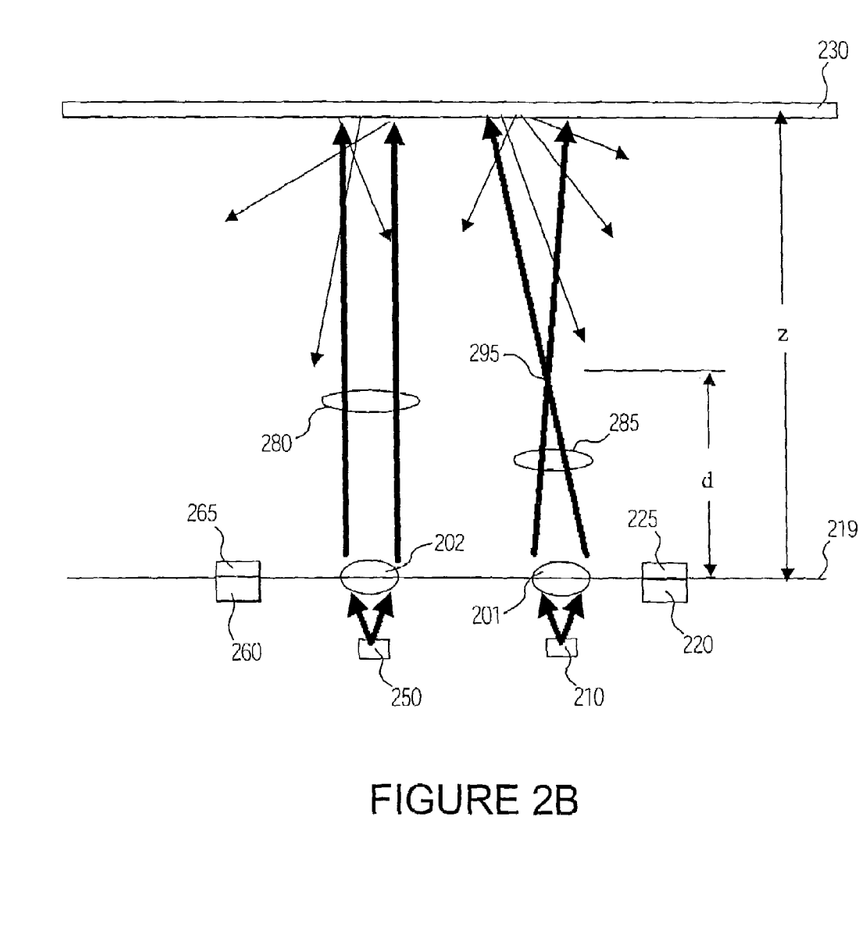
FIG. 2b shows a side view of an embodiment in accordance with the invention using a collimated and divergent beam.

FIG. 2a shows a top view, while FIG. 2b shows a side view of the geometry in an embodiment in accordance with the invention. The embodiment includes lasers 210 and 250, detectors 220 with wavelength filters 225 and detectors 260 with wavelength filters 265. Wavelength filters 225 and 265 in accordance with the invention typically have a bandwidth in the range from about 3 nm to about 20 nm, depending on the bandwidth separation of lasers 210 and 250. Detectors 220 and 260 are typically crystalline silicon detector arrays with detector strips alternating with spacer strips. In accordance with an embodiment of the invention, there are, for example, 124 detector strips alternating with 124 spacer strips, each with a width of about 35 μm and a length of about 2.5 mm. Strips typically have widths from about 5 μm to over 1000 μm.

Laser 250 along with detectors 260 and wavelength filters 265 is associated with two-dimensional navigation in the plane of target surface 230. Laser 250, which is typically an edge emitting laser or a vertical cavity surface emitting laser (VCSEL), emits laser beam 280 at wavelength $\lambda_A$. Laser beam 280 is collimated by collimating lens 202 and is incident on target surface 230. A portion of the speckle pattern from target surface 230 then passes through wavelength filters 265 that cover detectors 260. Note there are two sets of detectors 260 with wavelength filters 265 so displacement can be determined in the x and y directions. Wavelength filters 265 allow only light at wavelength $\lambda_A$ to pass. The separation distance between target surface 230 and detector plane 219 is equal to z.

Empirically, if the speckle spot size distribution is peaked at a value α, then the size distribution is approximately in the range, α/2<α<2α. If the detector strips have a width w then the speckle spot sizes detected lie in the range from about w to about 4 w. Speckle spot size is given by 1.22 $\lambda_A z/D_A$ where $D_A$ is the diameter of the irradiance by laser beam 280 on target surface 230. Note that for two-dimensional navigation in the plane of target surface 230, $D_A$ is independent of z because laser beam 280 is collimated by collimating lens 202. Assuming a typical $D_A$ of 1000 μm gives a speckle spot size of 0.001 z for $\lambda_A$=850 nm. Thus for a z of 5 mm, the speckle spot size is 5 μm. With a detector stripe width of 5 μm, detectors 260 can detect speckle spots with sizes ranging from about 5 μm to 20 μm. Speckle spots ranging from about 5 μm to about 20 μm correspond to a z range from about 5 mm to about 20 mm for navigation.

In accordance with the invention, the z range may be extended by adding a second set of detectors adjacent and parallel to detectors 260. The second set of detectors will have a different strip width. For example, if the second set of detectors have a strip width of 20 μm, the speckle spot size measured by the second set of detectors is in the range of about 20 μ to about 80 μm corresponding to a z range from about 20 mm to about 80 mm. To cover larger values of z, a third set of detectors may be added with the appropriate strip width and so on. Alternatively, in place of adding additional sets of detectors, detectors 260 without spacer strips and having the smallest strip width of, for example, 5 μm may be used. This allows electronically grouping together adjacent strips to obtain the aggregate detector width appropriate for the desired speckle spot size or desired distance z.

Relative displacement in the x-y plane of target surface 230 is typically determined by using a processor (not shown) to perform the necessary calculations using the electronic signals generated by detectors 260. In accordance with the invention, navigation is performed by tracking the motion of a speckle spot. This is typically accomplished by differencing the electronic signal between non-adjacent detector strips. This generates zero crossings as the speckle spot moves across detector 260.

Laser 210 along with detectors 220 and wavelength filters 225 is associated with navigation in the third dimension normal to target surface 230. Laser 210 is typically displaced on the order of 100 μm to 1000 μm from laser 250. Laser 210, which is typically an edge emitting laser or a vertical cavity surface emitting laser (VCSEL), emits laser beam 285 at wavelength $\lambda_B$. Laser beam 285 is focused by lens 201 to position 295 that lies between lens 201 and target surface 230. In some embodiments in accordance with the invention, focusing lens 201 may not be necessary if laser beam 285 from laser 210 is sufficiently divergent. In this context, sufficiently divergent means that the spot size on target surface 230 must be on the order of at least 1 mm in diameter. This requirement sets a minimum separation between target surface 230 and laser 210. As laser beam 285 diverges and is incident on target surface 230, a speckle pattern is generated.

Empirically, if the speckle spot size distribution is peaked at a value α, then the size distribution is approximately in the range, α/2<α<2α. If the detector strips have a width w then the speckle spot sizes detected lie in the range from about w to about 4 w. Speckle spot size is approximately given by 1.22$\lambda_B(z-d)/D_B$ where $D_B$ is the diameter of the irradiance by laser beam 285 on target surface 230. Because laser beam 285 is diverging, $D_B$ depends on the distance z. From geometry, given a divergence angle θ, $D_B$=2(z-d) tan θ. Using the expression for $D_B$ in the expression for speckle spot size shows that speckle spot size is independent of z and can be determined by choosing the divergence angle. The width of the detector strips for the set of detectors 220 can then be chosen to optimally detect the selected speckle spot size.

Wavelength filter 225 ensures that only light at wavelength $\lambda_B$ is collected by detectors 220. Determination of the separation z of target surface 230 from detector plane 219 is typically determined by using a processor (not shown) to perform the necessary calculations using the electronic signals generated by detectors 220 and detectors 260. In accordance with the invention, navigation in the third dimension is performed by tracking the motion of speckle spots at the two different wavelengths $\lambda_A$ and $\lambda_B$ as discussed below. Motion is typically tracked by differencing the electronic signal between detector strips. This generates zero crossings as speckle spots move across detectors 220 and detectors 260.

The following discussion illustrates how both the planar x and y coordinates of the detectors as well as the z coordinate of the detector plane can be determined in accordance with the invention. For both laser beams 280 and

285, incident angle $\theta_S$ (see FIG. 1) is approximately equal to zero. Assuming that the speckle pattern propagating in the surface normal direction from target surface 230 is incident on both sets of detectors 220 and 260 then gives $\theta_0$ equal to approximately zero (see FIG. 1). Hence, Eq. (1) simplifies to $$A_x = a_x \left\{ \frac{L_0}{L_S} + 1 \right\} \qquad (2)$$

The speckle pattern collected by detectors 260 has wavelength $\lambda_A$ with $L_S = \infty$ (laser beam 280 is collimated when incident with target surface 230) and $L_0 = z$. Taking $A_x^A$ to be the x-displacement of the speckle pattern at detectors 260 gives from Eq. (2):

$$A_x^A = a_x \left\{ \frac{z}{\infty} + 1 \right\} \qquad (3)$$

which simplifies to $A_x^A = \alpha_x$. The equation for y-displacement of the speckle pattern is similar, $A_y^A = \alpha_y$. Therefore, motion in the x and y direction is measured directly by detectors 260.

For detectors 220, only the speckle pattern at wavelength $\lambda_B$ is detected. Here, $L_S = z-d$ and $L_0 = z$. Substituting into Eq. (2) with $A_x^B$ being the x-displacement of the speckle pattern at detectors 220 gives:

$$A_x^B = a_x \left\{ \frac{z}{z-d} + 1 \right\} \qquad (4)$$

Solving Eq. (4) for z gives:

$$z = d \left\{ \frac{\frac{A_x^B}{a_x} - 1}{\frac{A_x^B}{a_x} - 2} \right\} \qquad (5)$$

However, $a_x$ is measured by detectors 260 and from Eq. (3) is equal to $A_x^A$ resulting in:

$$z = d \left\{ \frac{\frac{A_x^B}{A_x^A} - 1}{\frac{A_x^B}{A_x^A} - 2} \right\} \qquad (6)$$

Because $A_x^A$ and $A_x^B$ are measured quantities and d is known from the parameters of lens 201, the distance z can be determined according to Eq. (6) allowing three-dimensional navigation relative to target surface 230. Similarly, $A_y^A$ and $A_y^B$ are measured quantities from motion in the y-direction, d is known from the parameters of lens 201 so that z can also be determined from Eq. (6) by replacing $A_x^A$ with $A_y^A$ and $A_x^B$ with $A_y^B$. The redundancy improves precision as the values for z obtained from the two component directions, x and y, may be averaged. This is of particular interest when velocities are small. Additionally, if the relative velocity in one of the component directions is approximately zero, the z value may still be determined from the other component.

Figure 2C:
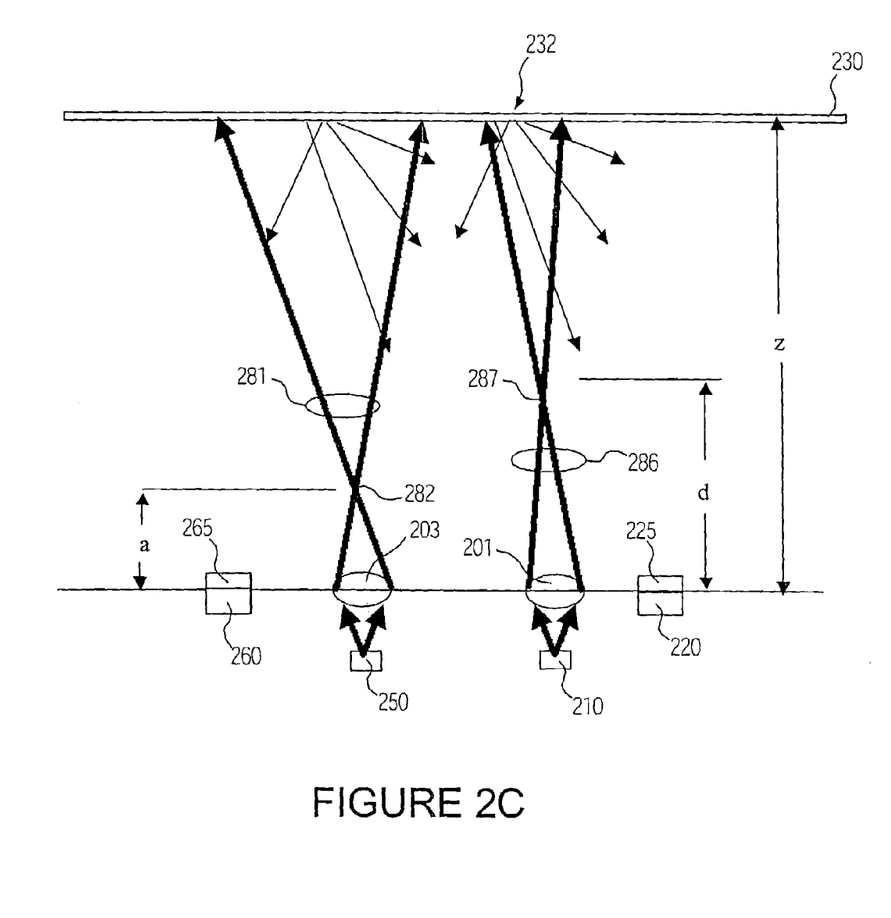
FIG. 2c shows a side view of an embodiment in accordance with the invention using two divergent beams.

FIG. 2c shows an embodiment in accordance with the invention. The embodiment in FIG. 2c has been modified in accordance with the invention to increase sensitivity of detection when motion in the x and y directions is small. Introduction of focusing lens 203 effectively increases the speckle speed across detectors 260 in comparison with using collimating lens 202 as shown in FIG. 2b for x and y motion. Therefore, x or y motion may be small but the corresponding motion across detectors 260 is greatly magnified and easier to detect which leads to greater precision in determining the z position. Hence, the more focused beam 286 becomes, the smaller surface region 232 is and the greater the apparent x and y speckle motion becomes across detectors 260. Surface region 232 is typically larger than about 200 μm to avoid correlation problems.

With reference to FIG. 2c and variables as defined above; d is the distance between the detector plane and point 287; and a is the distance between the detector plane and point 282:

$$A_x^B = a_x \left\{ \frac{z}{z-d} + 1 \right\} \qquad (7)$$

$$A_x^A = a_x \left\{ \frac{z}{z-a} + 1 \right\} \qquad (8)$$

noting the change in the expression for $A_x^A$ in Eq. (8) compared to Eq. (3). After combining Eqs. (7) and (8) and performing the algebra:

$$z = d \left\{ \frac{A_x^B(2z-a) - A_x^A(z-a)}{A_x^B(2z-a) - 2A_x^A(z-a)} \right\} \qquad (9)$$

Eq. (9) yields a quadratic equation for z which may be solved to obtain:

$$z = \frac{d(2A_x^B - A_x^A) + a(A_x^B - 2A_x^B) \pm \sqrt{\{d(2A_x^B - A_x^A) + a(A_x^B - 2A_x^A)\}^2 - 8ad(A_x^B - A_x^A)^2}}{4(A_x^B - A_x^A)} \qquad (10)$$

where the sign is chosen to make z>0.

Figure 2D:
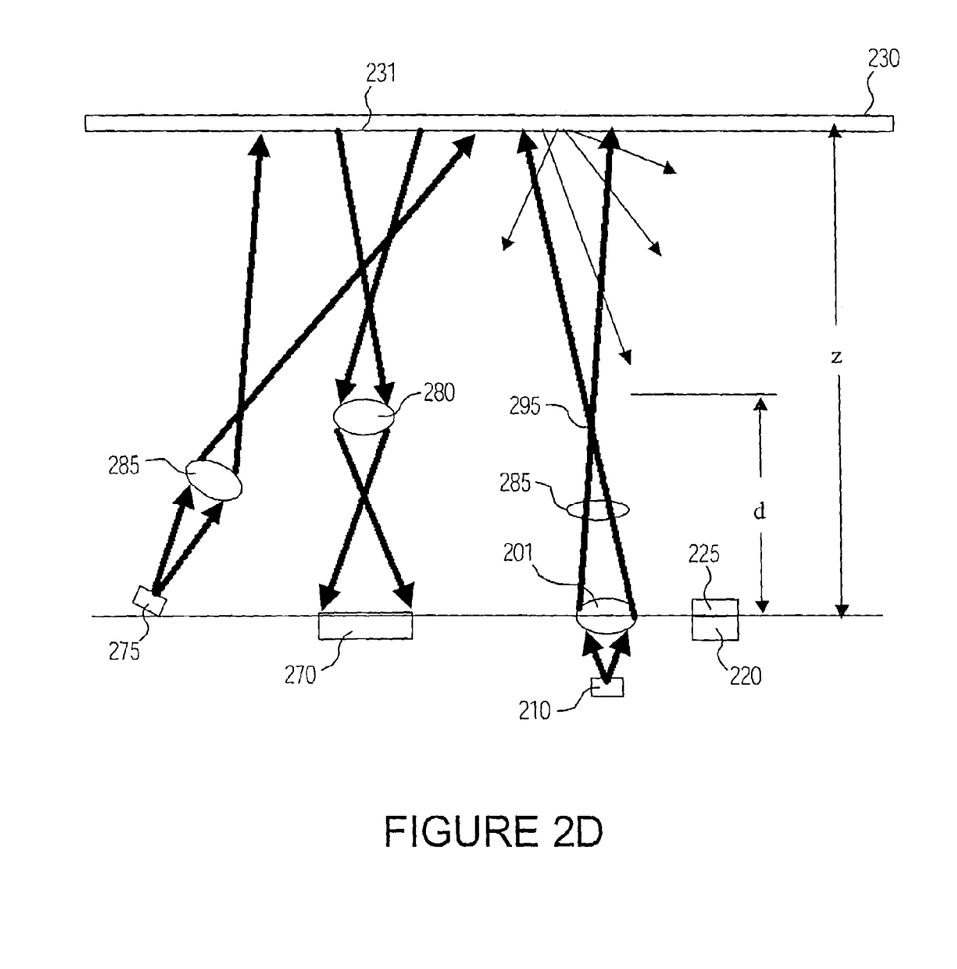
FIG. 2d shows a side view of an embodiment in accordance with the invention using two sources.

Another embodiment in accordance with the invention shown in FIG. 2d uses another method for two dimensional optical navigation as described in U.S. Pat. No. 5,644,139, hereby incorporated by reference. Speckle is used as previously described above in context with FIG. 2b to accomplish navigation in the third direction. Light source 275 is typically an LED but may also be a laser such as a VCSEL that emits a light beam projected by lens 285 onto surface 230 to illuminate region 231. The angle of incidence of the light beam onto surface 230 is typically in the range of between five and twenty degrees. Typically, surface 230 has a micro texture reflected in surface height variations that produce a pattern of highlights and shadows when illuminated from the side. An image of region 231 is projected onto detector 270 using lens 299. Detector 270 is typically a square array of photo detectors.

In FIG. 2d, light source 210, lens 201, filter 225 and detectors 220 are as defined above with respect to FIG. 2b and the analysis follows that for detectors 220 as discussed above. If light source 275 is a coherent source, then light source 210 is not needed. However, if light source 275 is an incoherent source such as an LED, then light source 210 is needed and light source 210 needs to be coherent.

By comparing successive stored images in a processor, the relative motion, $a_x$ and $a_y$, of detector 270 in the x and y directions with respect to surface 230 can be determined. Correlation of successive images is typically used to determine the displacement and direction of the relative movement. Successive captured scatter pattern images partially overlap with one another. Hence, the processor identifies features in each scatter pattern image and calculates the displacement and direction of the relative motion. Storing successive scatter pattern images, overlapping features can be identified by the processor using standard image correlation algorithms to provide direction and displacement. Further details may be found, for example, in U.S. Pat. No. 5,786,804 incorporated herein by reference.

Other optical navigation methods for two dimensional optical navigation such as those using, for example, specular reflection and described in copending U.S. patent application Ser. No. 10/630,169 may be used in accordance with the invention.

Figure 3A:
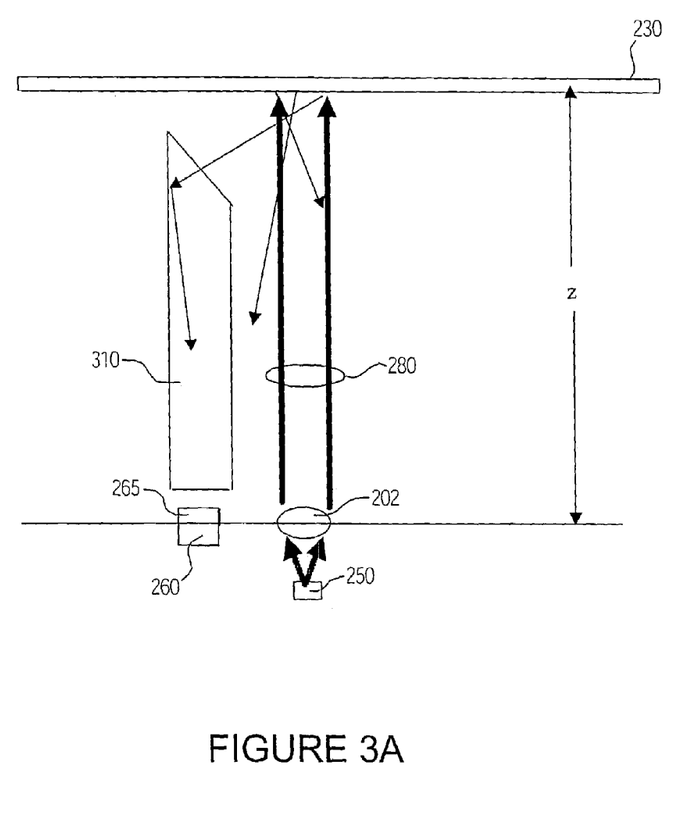
FIG. 3a shows the use of a lightpipe in accordance with an embodiment of the invention.
Figure 3B:
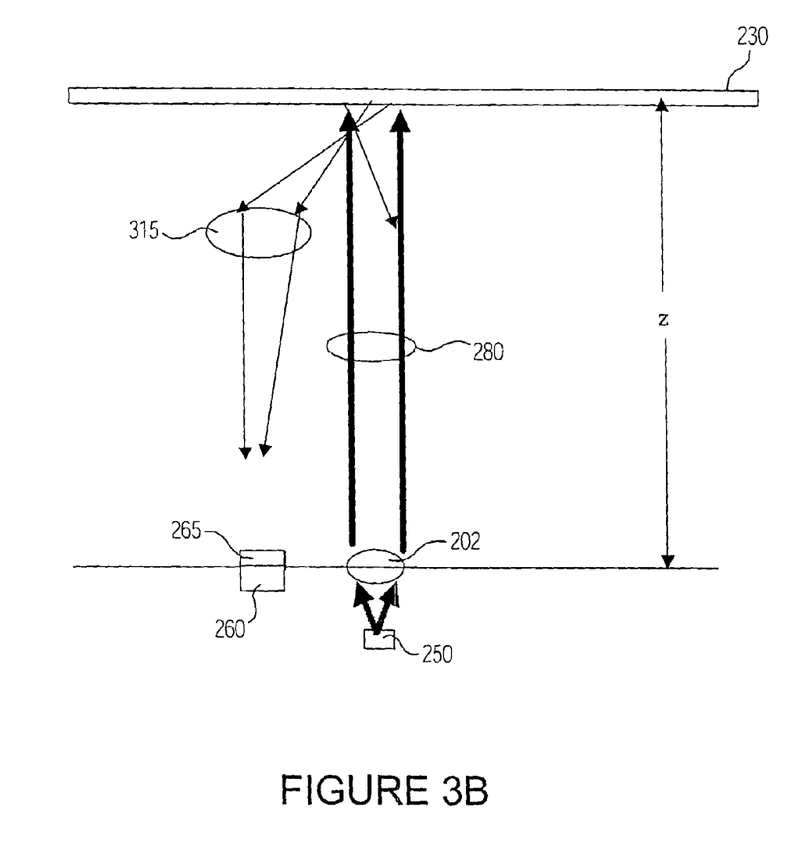
FIG. 3b shows the use of a collecting lens in accordance with an embodiment of the invention.

FIG. 3a shows an embodiment in accordance with the invention where lightpipe 310 has been added to increase collection efficiency. The portion of the embodiment for navigation in the third dimension has been suppressed for clarity. Because speckle is emitted nearly isotropically only about 1% of the speckle flux from target surface 230 is incident on detectors 260. Lightpipe 310 is typically an optically transparent block of material and is placed directly over detectors 260. Note that the top of lightpipe 310 is slanted to increase the surface area available for capturing the speckle light. Speckle light is incident on the slanted top of lightpipe 310 and is refracted into the lightpipe interior. Appreciable amount of speckle light propagating away from detectors 260 is redirected to detectors 260 by total internal reflection within lightpipe 310. Hence, the collecting efficiency is increased. Lightpipe 310 may be refined further as described in related application Ser. No. 10/632,619 cross-referenced above. FIG. 3b shows an embodiment in accordance with the invention where collection lens 315 is used instead of light pipe 310. Collection efficiencies for both lightpipe 310 and collection lens 315 are in the range of about 10 percent to 15 percent. However, using collection lens 315 is typically more complicated because magnification, lens aberration and image position become issues and must be accounted for. In particular, image position is a typically a problem if detectors 260 have only a few detector strips. As the speckle pattern is translated laterally, collection lens 315 causes the speckle pattern image to sweep partially across detectors 260. When detectors 260 have only a few detector strips, the signal from one or two of these strips is preferentially weighted. This weighting may suppress or increase the differential signal such that the signal lies entirely below or above, respectively, zero voltage. Therefore, the zero crossings (see discussion above) are not present and navigation is lost.

Figure 4:
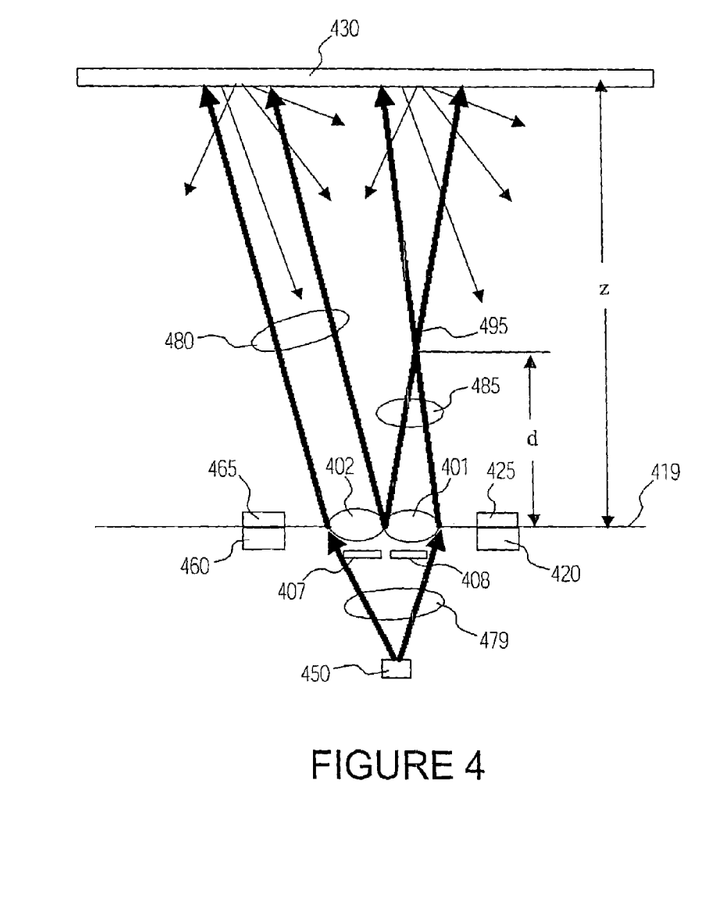
FIG. 4 shows a side view of an embodiment in accordance with the invention using a single coherent source.

FIG. 4 shows an embodiment in accordance with the invention using laser 450 in multimode with a typical bandwidth on the order of 5 nm in multimode operation and containing light at wavelengths $\lambda_1$ and $\lambda_2$. If multimode laser 450 is a VCSEL operating in the 850 nm range, wavelength filters 425 and 465 typically are selected to have a 1 nm bandwidth filter to insure that detectors 460 and 420 only collect light at wavelengths $\lambda_1$ and $\lambda_2$, respectively, corresponding to the appropriate speckle pattern. Divergence of laser beam 479 is typically about 30 degrees. FIG. 4 is similar to the configuration shown in FIG. 2b above but uses only a single laser. Narrowband $\lambda_1$ wavelength filter 407 is positioned in the path of laser beam 479 between multimode laser 450 and collimating lens 402 and narrowband $\lambda_2$ wavelength filter 408 is positioned in the path of laser beam 479 between multimode laser 450 and focusing lens 401. Typical bandwidths for narrowband wavelength filter 407 and narrowband wavelength filter 408 in accordance with the invention are on the order of about 1 nm.

In operation, only the portion of laser beam 479 at wavelength $\lambda_1$ is passed by narrowband wavelength filter 407 and collimated by collimating lens 402 into collimated beam 480. Collimated beam 480 is incident on target surface 430 to generate a speckle pattern at wavelength $\lambda_1$. Only the portion of laser beam 479 at wavelength $\lambda_2$ is passed by narrowband wavelength filter 408 and is focused by focusing lens 401 into focused beam 485. Focused beam 485 is focused to position 495 that lies between lens 401 and surface 430. Focused beam 485 diverges from position 495 and is incident on target surface 430 to generate a speckle pattern at $\lambda_2$.

A portion of the speckle pattern at wavelength $\lambda_1$ from target surface 430 passes through narrowband wavelength filters 465 that cover detectors 460. This speckle pattern is used for two-dimensional navigation on target surface 430. Narrowband wavelength filters 465 only allow light at wavelength $\lambda_1$ to pass and block light at wavelength $\lambda_2$. The separation distance between target surface 430 and detector plane 419 is equal to z. Empirically, if the speckle spot size distribution is peaked at a value $\alpha$, then the speckle size distribution is approximately in the range, $\alpha/2<\alpha<2\alpha$. If detector strips have a width w then the speckle spot sizes detected lie in the range from about w to about 4 w. Speckle spot size at wavelength $\lambda_1$ is given by $1.22\lambda_1 z/D_1$ where $D_1$ is the diameter of the irradiance by collimated beam 480 on target surface 430. For two-dimensional navigation in the plane of target surface 230, $D_1$ is independent of z because beam 480 is collimated. Assuming a typical $D_1$ of 1000 µm gives a speckle spot size of about 0.001 z for $\lambda_1 \sim 850$ nm. Therefore, for a z of 5 mm, the speckle spot size is 5 µm. With a detector stripe width of 5 µm, detectors 460 can detect speckle spots with sizes ranging from about 5 µm to 20 µm. Speckle spots ranging from about 5 µm to about 20 µm correspond to a z range from about 5 mm to about 20 mm. The z range may be extended as discussed above.

A portion of the speckle pattern at wavelength 2 from target surface 430 passes through narrowband wavelength filters 425 that cover detectors 420. This speckle pattern at $\lambda_2$ together with the speckle pattern at wavelength $\lambda_1$ used for two-dimensional navigation allows navigation in the third dimension normal to target surface 430. Narrowband wavelength filters 425 only allow light at wavelength $\lambda_2$ to pass and block light at wavelength $\lambda_1$. The separation distance between target surface 430 and detector plane 419 is equal to z. Empirically, if the speckle spot size distribution is peaked at a value $\alpha$, then the speckle size distribution is approximately in the range, $\alpha/2<\alpha<2\alpha$. If detector strips have a width w then the speckle spot sizes detected lie in the range from about w to about 4 w. Speckle spot size at wavelength $\lambda_2$ is given by $1.22\lambda_2(z-d)/D_2$ where $D_2$ is the diameter of the irradiance by focused beam 485 on target surface 430. Because focused beam 485 is diverging, $D_2$ depends on the distance z. From geometry, given a divergence angle $\theta$ for focused beam 485, $D_2=2(z-d)\tan\theta$. Substituting the expression for $D_2$ in the expression for speckle spot size shows that the speckle spot size is independent of z and can be determined by choice of the divergence angle θ. The width of the detector strips for the set of detectors 420 can then be chosen to optimally detect the selected speckle spot size.

Determination of the separation z of target surface 430 from detector plane 419 is typically determined by using a processor (not shown) to perform the necessary calculations using the electronic signals generated by detectors 420 and detectors 460 as discussed above.

Figure 5A:
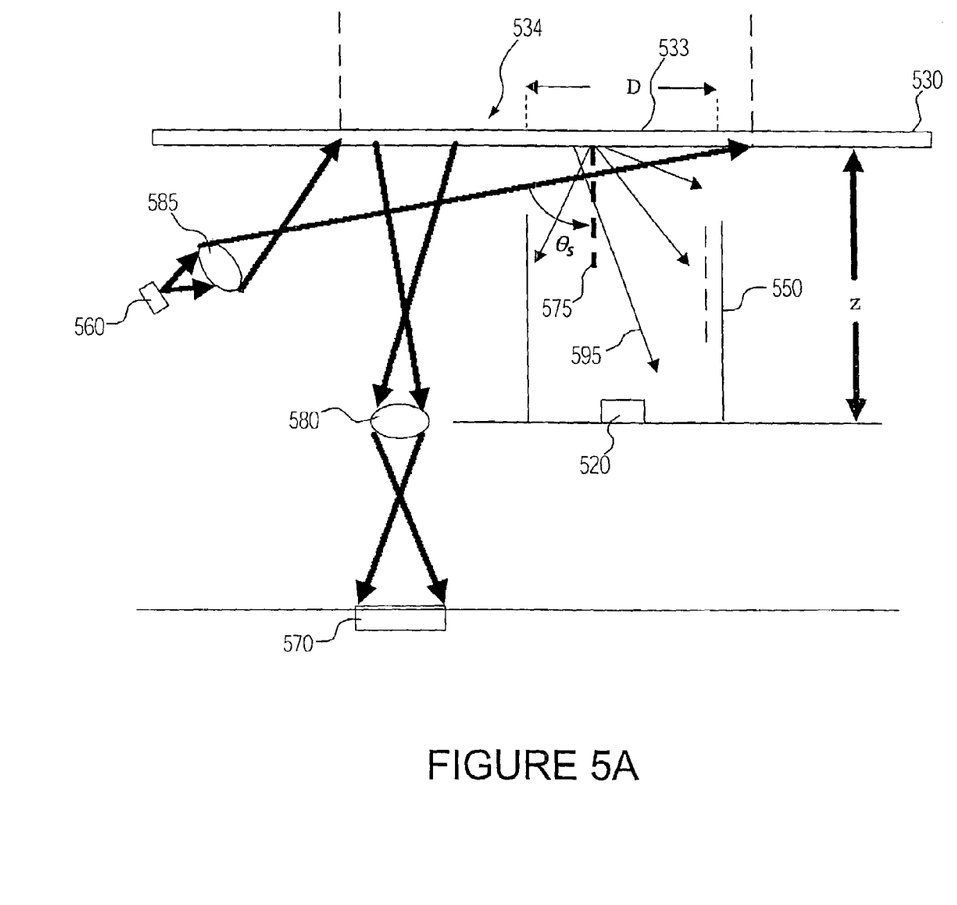
FIG. 5a shows a side view of an embodiment in accordance with the invention using a single coherent source.

FIG. 5 is an embodiment in accordance with the invention using only a single light source. Two dimensional optical navigation is accomplished as described with respect to FIG. 2d above and is disclosed in detail in U.S. Pat. No. 5,644, 139, incorporated by reference above. Speckle is used as previously described above in context with FIGS. 2b and 2d to accomplish navigation in the third direction. In the embodiment of FIG. 5, light from laser 560 is projected by lens 585 onto surface 530 to illuminate a large spot that is surface region 534. The angle of incidence of the light beam onto surface 530 is typically in the range of between five and twenty degrees. Typically, surface 530 has a micro texture reflected in surface height variations that produce a pattern of highlights and shadows when illuminated from the side. Most of surface region 534 is projected onto detector 570 using lens 580. Detector 570 is typically a square array of photodetectors.

From FIG. 5a, surface region 533 on surface 530 is typically a relatively small part of surface region 534 and is defined by aperture 550 which restricts speckle return from reaching detector 570. Surface region 533 has a spot diameter D and is the source of speckle 595. Detectors 520 are a distance z away from surface region 533.

With reference to Eq. (1) and FIG. 5, $\theta_0=0$, $\theta_S$ is the angle of incidence with respect to normal 575, $L_O=z$ and $L_S$ is the distance between the focus of lens 585 and surface region 533 giving:

$$A_x^B = a_x \left\{ \frac{z\cos^2\theta_S}{L_S} + 1 \right\} \quad (11)$$

Figure 5B:
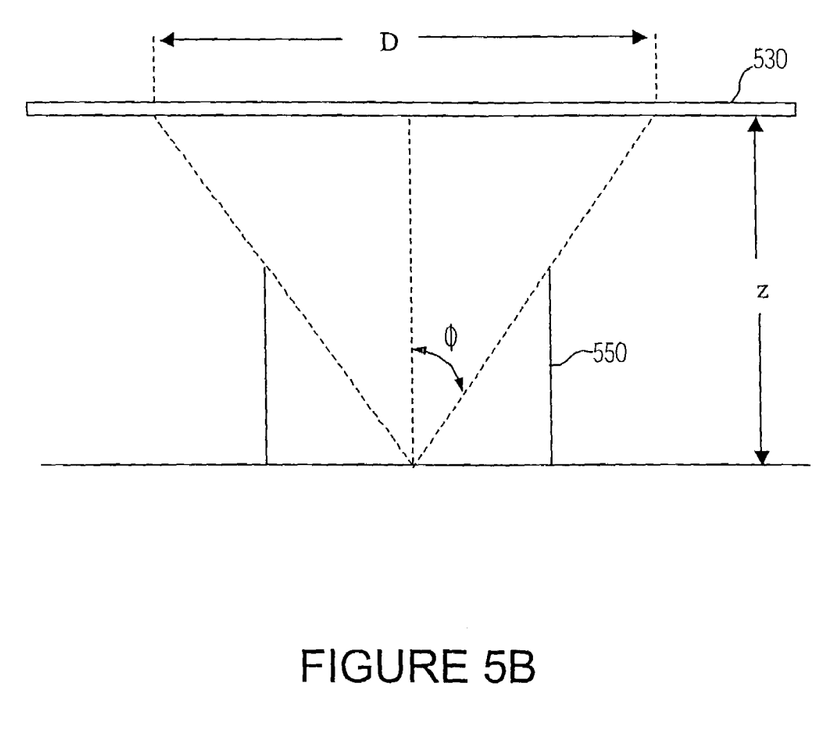

Eq. (11) may be solved for z if $A_x^B$ and $a_x$ are known. $A_x^B$ is measured by detectors 520 and $a_x$ is measured by detectors 570. Detectors 520 are speckle detectors and detectors 570 are image correlation detectors. FIG. 5b shows the geometry for the acceptance angle φ of detectors 520. Acceptance angle φ is limited by aperture 550 and is a constant for given aperture 550. From FIG. 5b:

$$D = 2z \tan \phi \quad (12)$$

Speckle spot size $\sim 1.22\lambda D/z = 1.22\lambda 2 z \tan \phi/z = 2.44\lambda \tan \phi$ which is independent of the distance z. Hence, the speckle spot size is again independent of z as above, and displacement may again be determined in both the x and y directions as well as z according to Eq. (11). The embodiment in accordance with the invention in FIG. 5a allows the use of a single source, laser 560, without the need for wavelength filters for detectors 570 and 520.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. An optical navigation system, comprising:
   a first light source operable to produce a coherent first light beam for illuminating a target surface;
   a second light source operable to produce a second light beam for illuminating the target surface;
   a first detector operable to produce first optical data in response to receipt of a reflection of the first light beam from the target surface;
   a second detector operable to produce second optical data in response to receipt of a reflection of the second light beam from the target surface; and
   a processor operable to determine from the first optical data a first displacement measure corresponding to a displacement of a pattern imaged by the first detector, determine from the second optical data a second displacement measure corresponding to a displacement of a pattern imaged by the second detector, and calculate a distance to the target surface from the first and second displacement measures.

2. The system of claim 1, wherein the first detector and the second detector define a detector plane, and the processor is operable to calculate a distance between the detector plane and the target surface from the first and second displacement measures.

3. The system of claim 1, further comprising a first lens operable to direct the first light beam onto a first area of the target surface and a second lens operable to direct the second light beam to a second area of the target surface, wherein the first and second areas of the target surface are non-overlapping.

4. The system of claim 1, wherein the first light source comprises a laser that produces the first light beam at a first lasing wavelength, and further comprising a first wavelength filter that intercepts the reflection of the first light beam and selectively passes light at the first lasing wavelength to the first detector.

5. The system of claim 4, wherein the second light source comprises a laser that produces the second light beam at a second lasing wavelength and the first wavelength filter blocks light at the second lasing wavelength, and further comprising a second wavelength filter that intercepts the reflection of the second light beam and selectively passes light at the second lasing wavelength to the second detector and blocks light at the first lasing wavelength.

6. The system claim 4, wherein the second light source comprises a light emitting diode that produces the second light beam.

7. The system of claim 1, further comprising a lightpipe that receives the reflection of the second light beam and guides the received reflection to the second detector.

8. The system of claim 1, further comprising a collection lens that receives the reflection of the second light beam and directs the received reflection to the second detector.

9. The system of claim 1, further comprising a collimating lens positioned between the second light source and the target surface.

10. The system of claim 1, wherein the first detector comprises an array of detector strips separated by non detector strips, and the processor is operable to determine the first displacement measure by differencing electrical signals produced by respective ones of the detector strips.

11. An optical navigation systems comprising:
    a coherent light source operable to illuminate a target surface with coherent first light beam comprising a first wavelength and a coherent second light beam comprising a second wavelength;

a first detector operable to produce first optical data in response to receipt of a reflection of the first light beam from the target surface;

a second detector operable to produce second optical data in response to receipt of a reflection of the second light beam from the target surface; and a processor operable to determine from the first optical data a first displacement measure corresponding to a displacement of a pattern imaged by the first detector, determine from the second optical data a second displacement measure corresponding to a displacement of a pattern imaged by the second detector, and calculate a distance to the target surface from the first and second displacement measures.

12. The system of claim 11, wherein the coherent light source comprises a first narrowband wavelength filter that selectively passes light at the first wavelength while blocking light at the second wavelength to produce the first light beam, and a second narrowband wavelength filter that selectively passes light at the second wavelength while blocking light at the first wavelength to produce the second light beam.

13. The system of claim 11, wherein the first detector and the second detector define a detector plane, and the processor is operable to calculate a distance between the detector plane and the target surface from the first and second displacement measures.

14. The system of claim 11, further comprising a first lens operable to direct the first light beam onto a first area of the target surface and a second lens operable to direct the second light beam to a second area of the target surface, wherein the first and second areas of the target surface are non-overlapping.

15. The system of claim 11, further comprising:

a third wavelength filter that intercepts the reflection of the first light beam, selectively passes light at the first wavelength to the first detector, and blocks light at the second wavelength; and a fourth wavelength filter that intercepts the reflection of the second light beam, selectively passes light at the second wavelength to the second detector, and blocks light at the first wavelength.

16. The system of claim 11, wherein the light source comprises a focusing lens and a collimating lens the focusing lens producing the first light beam with a curved wavefront at the target surface, and the collimating lens producing the second light beam with a planar wavefront at the target surface.

17. The system of claim 11, further comprising a lightpipe that receives the reflection of the second light beam and guides the received reflection to the second detector.

18. The system of claim 11, further comprising a collection lens that receives the reflection of the second light beam and directs the received reflection to the second detector.

19. The system of claim 11, wherein the first detector comprises an array of detector strips separated by non detector strips, and the processor is operable to determine the first displacement measure by differencing electrical signals produced by respective ones of the detector strips.

20. The system of claim 19, wherein the second detector comprises an array of detector strips separated by non detector strips, and the processor is operable to determine the second displacement measure by differencing electrical signals produced by respective ones of the detector strips of the second detector.

21. An optical navigation system, comprising:

a coherent light source operable to produce a coherent light beam for illuminating a target surface;

a first detector operable to produce first optical data in response to receipt of a first reflection of the coherent light beam from the target surface;

a second detector operable to produce second optical data in response to receipt of a second reflection of the coherent light beam from the target surface; and a processor operable to determine from the first optical data a first displacement measure corresponding to a displacement of a pattern imaged by the first detector, determine from the second optical data a second displacement measure corresponding to a displacement of a pattern imaged by the second detector, and calculate a distance to the target surface from the first and second displacement measures.

22. The optical navigation system of claim 21, wherein said coherent light source is configured in relation to the first and second detectors such that when the first and second detectors are parallel to the target surface the coherent light source produces the coherent light beam at an angle of incidence between five and twenty degrees with respect to an axis orthogonal to the target surface.

23. The optical navigation system of claim 21, further comprising an aperture that restricts the first detector to a field of view corresponding to a first area of the target surface, and a lens that restricts the second detector to a field of view corresponding to a second area of the target surface, wherein the first and second areas of the target surface are non-overlapping.

24. The optical navigation system of claim 21, wherein the first detector comprises an array of detector strips separated by non detector strips the second detector comprises a two-dimensional array of photodetectors, and the processor is operable to determine the first displacement measure by differencing electrical signals produced by respective ones of the detector strips of the first detector and to determine the second displacement measure from correlations between images captured by the second detector.

* * * * *

UNITED STATES PATENT AND TRADEMARK OFFICE
CERTIFICATE OF CORRECTION

PATENT NO. : 7,205,521 B2  Page 1 of 1
APPLICATION NO. : 10/632574
DATED : April 17, 2007
INVENTOR(S) : Russell Gruhlke It is certified that error appears in the above-identified patent and that said Letters Patent is hereby corrected as shown below:

Col. 1 Line 1 Delete "Avage" and insert -- Avago --, therefor.

Col. 2 Line 1 Delete "detection" and insert -- Detection --, therefor.

Col. 2 Line 1 Delete "SPeckle" and insert -- Speckle --, therefor.

Col. 2 Line 2 Delete "Propertires" and insert -- Properties --, therefor.

Col. 10 Line 46 In Claim 6, after "system" insert -- of --.

Col. 10 Line 63 In Claim 11, delete "systems" and insert -- system, --, therefor.

Col. 10 Line 65 In Claim 11, after "with" insert -- a --.

Col. 11 Line 44 In Claim 16, after "collimating lens" insert -- , --.

Signed and Sealed this

Thirtieth Day of December, 2008

JON W. DUDAS
*Director of the United States Patent and Trademark Office*